Dec. 26, 1961 P. JEPSON 3,014,679
FISHING ROD HOLDER
Filed Dec. 22, 1958 3 Sheets-Sheet 1
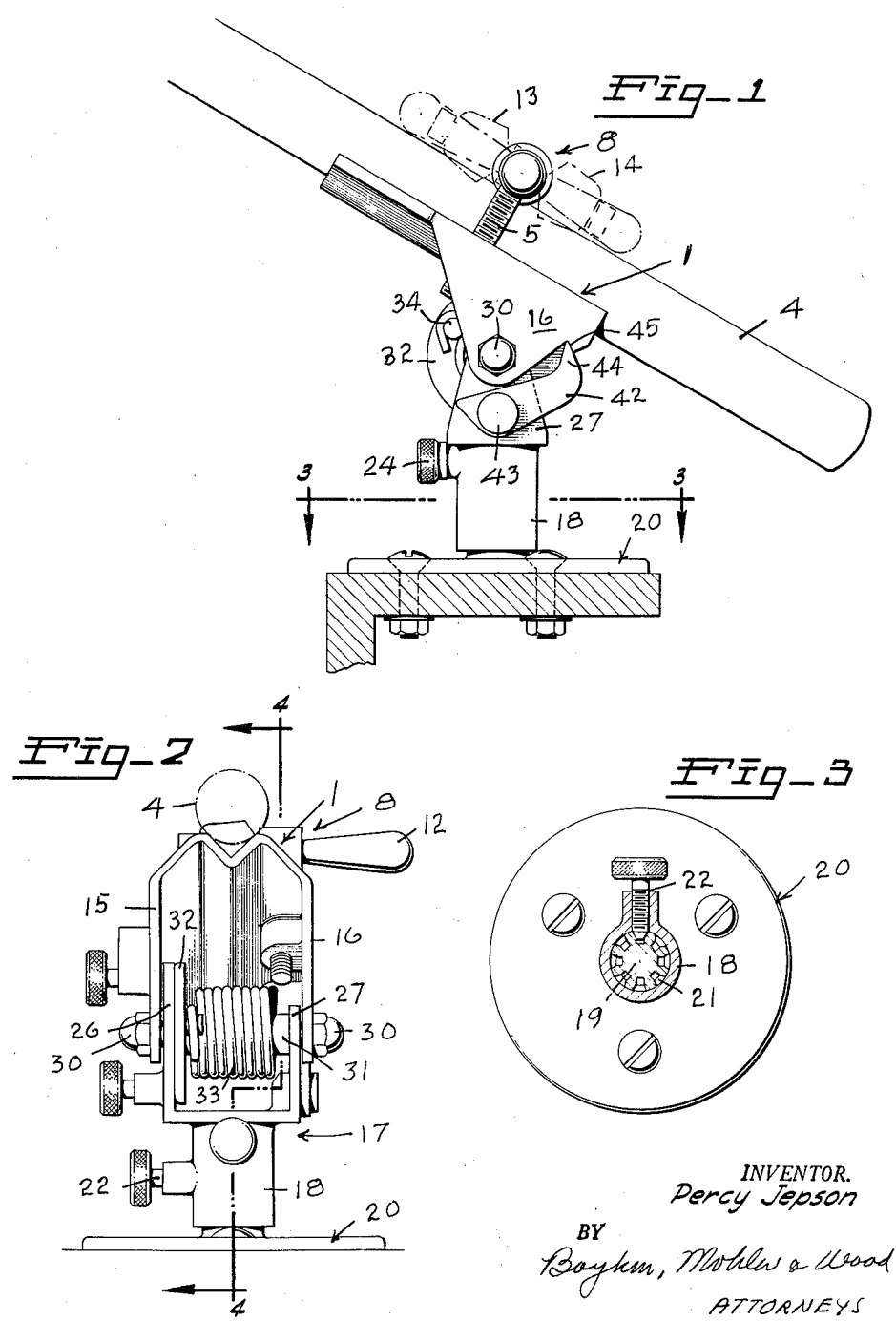
INVENTOR.
Percy Jepson
BY
Boyken, Mohler & Wood
ATTORNEYS Dec. 26, 1961 P. JEPSON 3,014,679
FISHING ROD HOLDER
Filed Dec. 22, 1958 3 Sheets-Sheet 2
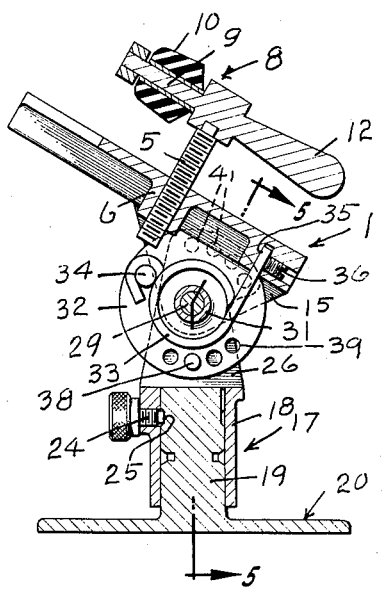
*Fig_4*
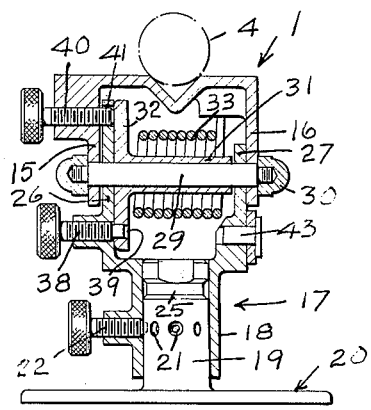
*Fig_5*
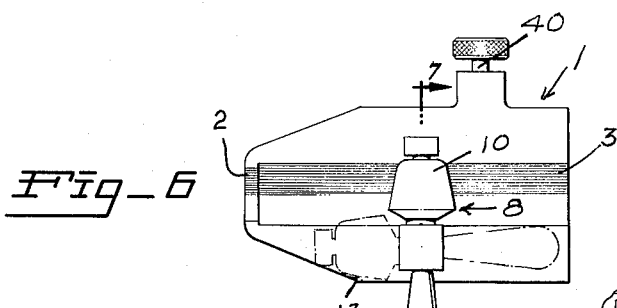
*Fig_6*
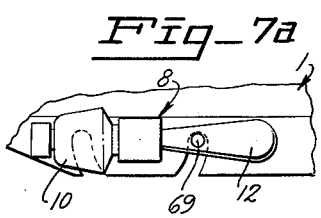
*Fig_7a*
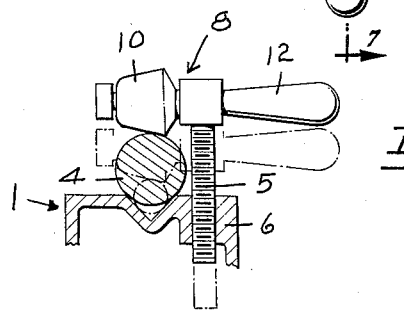
*Fig_7*
INVENTOR.
Percy Jepson
BY
Boylan Mohler & Wood
ATTORNEYS Dec. 26, 1961 P. JEPSON 3,014,679
FISHING ROD HOLDER
Filed Dec. 22, 1958 3 Sheets-Sheet 3

INVENTOR.
Percy Jepson
BY
Boyken, Mohler & Wood
ATTORNEYS 3,014,679
FISHING ROD HOLDER
Percy Jepson, 313 Park View Terrace, Oakland 10, Calif.
Filed Dec. 22, 1958, Ser. No. 785,545
5 Claims. (Cl. 248—40)

This invention relates to a fishing rod holder, and has for one of its objects the provision of a fishing rod holder that includes simple, strong, means for enabling a fisherman using it to more quickly, conveniently, and efficiently release the fishing rod from said holder than heretofore, and which means is adapted to be operated easily and quickly for securing a rod to said holder.

Another object of the invention is the provision of a fishing rod holder having strong, simple, quickly manipulatable and quick releasable means for securing rod-handles of different diameters rigidly to a fishing rod holder.

An additional object of the invention is the provision of a fishing rod holder that includes means automatically actuatable for applying a quick jerk on the fishing line connected with the rod that is supported and held on said holder upon a fish taking the bait and hook to thereby automatically "set" the hook in the mouth of the fish.

Another object of the invention is the provision of a fishing rod holder and mounting means therefor, to enable any desired adjustment and movement of the rod when it is mounted on said holder.

Other objects and advantages will appear in the description and in the drawings.

In the drawings FIG. 1 is a side elevational view of a rod holder illustrative of the present invention, which holder is mounted on any suitable support, one type being generally indicated in cross section. The handle portion of a conventional fishing rod is indicated on the holder, and dot-dash lines in the view indicate two optional positions of the hold-down device for the rod handle.

FIG. 2 is a front elevational view of the holder of FIG. 1 as seen from the left hand side of FIG. 1, the rod handle being indicated in dot-dash lines.

FIG. 3 is a sectional view taken along line 3—3 of FIG. 1.

FIG. 4 is a sectional view taken along line 4—4 of FIG. 2.

FIG. 5 is a sectional view taken along line 5—5 of FIG. 4.

FIG. 6 is a top plan view of the rod-supporting member of the holder.

FIG. 7 is a sectional view taken along line 7—7 of FIG. 6.

FIG. 7a shows a modification of the hold-down device of FIG. 6.

Figure 8:
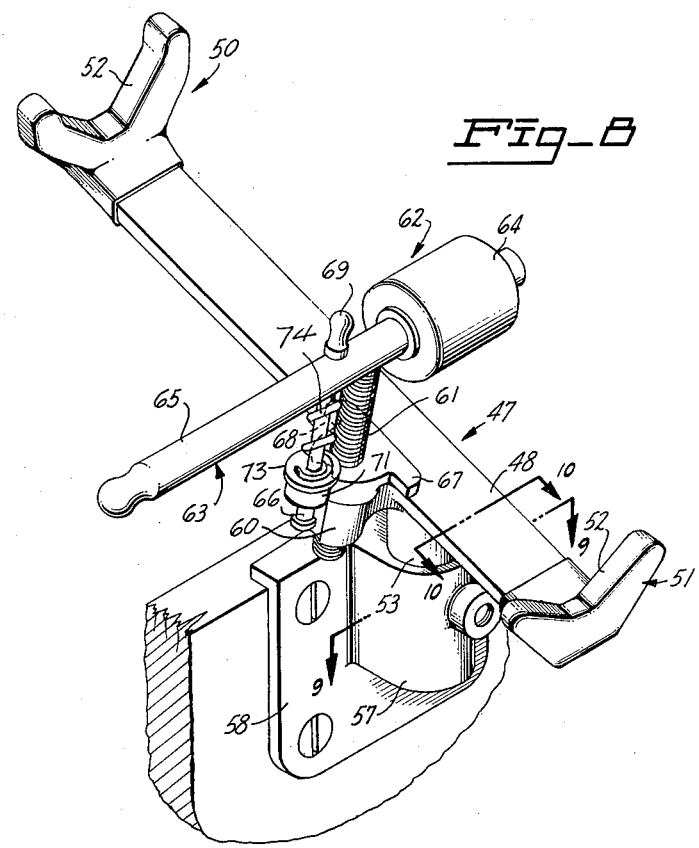
FIG. 8 is a perspective view of a modified form of the holder of FIG. 1.
Figure 10:
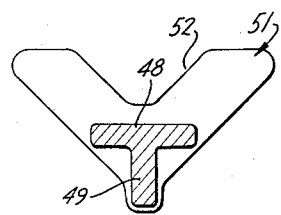
Figure 9:
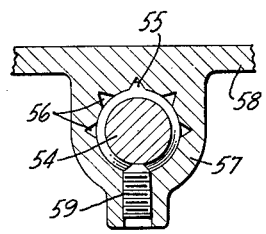

FIGS. 9, 10 respectively are sectional views taken along lines 9—9 and 10—10 of FIG. 8.

In detail, the rod supporting member of the holder is generally designated 1, and comprises a pair of spaced, aligned, generally V-shaped portions 2, 3 (FIG. 6) on which the elongated handle 4 of a fishing rod is adapted to be firmly held by a hold-down device, later to be described more in detail.

As seen in FIG. 6 the rod supporting member 1 is elongated, and the V-shaped portions 2, 3 are end portions of a generally V-shaped channel that extends longitudinally of member 1. End portion 2 is of less depth than end portion 3, hence the rod handle 4 will only engage the sides of the V-shaped channel at the end portions 2, 3 thereof and the part of handle 4 between said end portions 2, 3 will be free to be slightly sprung towards the bottom of the channel if sufficient pressure in a direction toward the channel is placed on said part. Obviously the part of the member 1 that is between end portions 2, 3 thereof could be omitted as long as the end portions 2, 3 are rigid relative to each other and are connected by any suitable rigid means.

The hold down device for holding the rod handle firmly on the member 1 and against portions 2, 3 thereof, includes an externally threaded post 5 (FIGS. 1, 4, 7). This post 5 is carried by member 1 at a point offset to one side of the central V-shaped channel, and at a point substantially centrally between portions 2, 3.

Member 1 is formed with a threaded opening in an enlarged part 6 thereof in which said post is threadedly held for movement of the post relative to member 1 upon rotation of the post. The portion 6 of said member 1 supports post 5 with the longitudinal axis of the latter disposed at right angles relative to the longitudinal axis of handle 4 (FIG. 1) when said handle is on the member 1.

Rigid on the upper end of post 5 is a horizontally elongated, rigid, hold-down element generally designated 8.

This hold-down element comprises a rigid arm 9 projecting laterally to one side of the upper end of post 9 at right angles to the latter, and it includes a roller 10 of relatively soft rubber or the like. Roller 10 is generally frusto-conical in shape with the larger diameter end thereof adjacent to post 5.

Also rigid with the post 5 and with arm 9 is an axial extension 12 of the arm 9 that projects to the side of post 5 opposite to arm 9. Extension 13 is a handle for engagement by the hand of an operator for rotating or revolving the arm 9 and roller 10 thereon about the axis of post 5.

In the operation of securing rod handle 4 to the member 1, when the arm 9 and handle 12 are positioned with their common axis parallel with the axis of the rod handle 4, as seen in dot-dash lines in FIG. 6, the handle 4 may readily be positioned on the member 1 in engagement with portions 2, 3. Preferably the handle 12 is in such a position that in swinging it to the full line position in FIG. 6 for moving roller 10 to a position over the handle 4, the roller will be progressively tightened against the rod handle 4 by reason of the threaded mounting for the post 5. Upon so revolving the handle 12 about the axis of post 5, the roller 10 will engage the upper side of rod 4 and if the pressure is great enough, the part of rod handle 4 that is between end portions 2, 3 may be very lightly sprung toward member 1 and the handle 4 will be tightly held on member 1 against either rotation of the handle relative to member 1 or against any relative movement of any kind with respect to member 1. Also the hold-down device, by reason of the pressure of roller 10 on the rod, will be frictionally held in hold-down position.

The frusto-conical shape of roller 10 enables the latter to roll over handle 4, which is usually substantially cylindrical, from either of the dot-dash line positions 13, 14 (FIG. 1).

When the hold-down device is in its position for holding the rod handle on member 1, the handle 12 may be quickly engaged by the hand of an operator in the normal movement of such hand to a position grasping the rod handle, and such movement upon such engagement between the hand and handle 12 will result in roller 10 being rolled off the rod to one of the positions 13, 14 (according to the device of the operator) and the rod handle will be entirely free from securement to the member 1 when the hands of the operator are grasping the rod handle. The means permitting this rapid release of rod handle 4 is quite important, since heretofore the different rod holding element have been more difficult to operate, and the fisherman has lost invaluable time in releasing the rod handle from the holder.

The member 1 is formed with a pair of spaced, opposed flanges 15, 16 depending therefrom (FIG. 5) and below member 1 is a base generally designated 17. Base 17 includes a downwardly projecting and downwardly opening cylindrical socket 18 that is adapted to rotatably receive therein an upwardly projecting cylindrical post 19. Post 19 is rigid on a member 20, which member may take any suitable form for screwing, bolting or clamping it in any desired position on a boat, seat, wharf, etc. In FIG. 3 member 20 is indicated as being circular, and it is indicated in FIG. 1 as being screwed to a position 11 of a boat, but this is purely for purpose of illustration. Also the post 19 may be horizontal or at any desired angle.

Post 19 is formed with an annular row of outwardly opening recesses 21 (FIG. 5) respectively adapted to receive the outer end of a locking screw 22. The row of recesses is coaxial with the post and screw 22 is threadedly carried by a wall of socket 19. By reason of the screw 22 and recesses 21, the member 1 may be locked at any desired point in rotation of the member about the axis of the socket and post 19.

In the event free rotation of the socket 18 on post 19 is desired, without removal of the socket and member 1 from the post, a screw 24, threadedly carried by socket 18 is adapted to extend at its outer end into an annular outwardly opening recess 25 formed around the upper end of post 19 (FIG. 4). By rotating screw 24 in one direction the outer end of screw 24 will move out of recess 25 and upon loosening of screw 22 the socket and all parts carried thereon will readily lift off post 19. When screw 24 is rotated so that its outer end is in recess 25, the socket and all parts thereon will be held on the post 19, but they can rotate freely about the axis of said post as long as the outer end of screw 22 is out of the recesses 21.

A pair of horizontally spaced, opposed, upwardly extending wings 26, 27 are integral with socket member 18, and they extend between the downwardly extending flanges 15, 16 of the rod supporting member 1. Wing 26 may be substantially against the inner side of flange 15, while wing 27 is substantially against the inner side of flange 16.

A horizontal pivot pin 29 extends through aligned openings in flanges 15, 16 and wings 26, 27 and pivotally supports the rod supporting member 1 for swinging about the axis of said pin. This pin 29 may be removably held in place by caps 30 threadedly held on the ends of the pins adjacent to the flanges 15, 16.

Mounted on the pin 29 in a position between wings 26, 27 is a sleeve bearing 31 formed at one end with a circular radially outwardly projecting flange 32. This flange is substantially against the inner side of wing 26, and a helical torsion spring 33 around sleeve 31 is secured at one end to a pin 34 that, in turn, is rigid with the flange 32, while the opposite end of said spring extends into a recess 35 (FIG. 4) that is formed in the underside of the rod supporting member 1. A set screw 36 may releasably secure the last mentioned end of spring 33 in said recess 35.

Threadedly carried by wing 26 is a screw 38 adapted to extend into any one of an arcuate row of openings 39 (FIGS. 4, 5) formed in the flange 32.

Screw 40 carried by the flange 16 of the member 1 is adapted to extend through any one of an arcuate row of openings 41 in the wing 26. Each of the screws 22, 24, 36, 39 has an enlarged knurled head adapted to be engaged by the fingers of the operator for easy rotation of each screw.

From the foregoing description it will be seen that when screw 40 extends at its outer end through one of the openings 41, the rod supporting member 1 will be locked against pivotal movement on the pivot pin 29. Hence, the fisherman may adjust the angular or tilted position of the rod supporting member 1 to whatever angle is desired, and lock it in that position.

The wing 27, as seen in FIG. 1, carries a latch arm 42 pivotally connected at one end to said wing by a pivot 43. The end of the latch opposite to pivot 43 is formed with a tooth 44 that projects upwardly. This tooth is adapted to engage in a notch 45 formed in flange 16 of the member 1 to prevent clockwise rotation of the rod supporting member 1 when the tooth is in said notch.

In a normal operation, when the tooth is to be used for holding the rod supporting member 1 in a normal rod supporting position, such as indicated in FIG. 1 the screw 40 is not used, and the rod supporting member 1 is under the tension of spring 33 that tends to rotate the rod supporting member 1 in a clockwise direction as seen in FIG. 1.

To adjust the rod supporting member so that it will be yieldably held against tooth 44 under the desired tension of the spring 33, the screws 38, 40 are both rotated to move them out of engagement with the flange 32 so that the rod supporting member 1 and the flange 32 will be free to rotate about the axis of pin 29.

The more nearly the rod supporting member 1 is moved to a vertical position before screw 38 is moved into one of the holes 39, the greater will be the tension on said member tending to return it to vertical position when said member is rotated counter clockwise (FIG. 1) to the point where the tooth 44 may swing into notch 45 for holding said member 1 in the position shown in FIG. 1. The customary fishing line (not shown) extends from a reel to the uppermost end of the rod, and then away from said uppermost end toward the left from the rod, the handle portion 4 of which is shown in FIG. 1. Upon a fish striking the bait on such line and taking the hook, the line will be jerked and the rod supporting member 1 will be rotated slightly in a counterclockwise direction (FIG. 1) whereupon the latch tooth 44 will drop by gravity and the spring 33 will be effective to quickly swing the rod supporting member and the rod therein in a clockwise direction so that the hook will be set in the mouth of the fish immediately upon the usual slackening of the pull on the line following a strike. A tail 46 on the end of latch arm 42 will engage the lower edge of flange 16 to act as a stop to prevent the arm 42 from swinging an objectionable distance around the pivot 43.

Any desired tension could be placed on the rod supporting member by the provision of the row of holes 39 for screw 38.

Once a fish is on the line the fisherman may, in one easy and natural movement of a hand toward rod grasping position, engage the handle 12 of the hold-down element and swing it to either of the dot-dash line positions 13, 14 according to which is easiest for the fisherman. The rod will then be free from the supporting member 1, and the fish may be played in the usual manner.

The form of invention as shown in FIG. 8 is particularly adapted for deep sea fishing although it is not necessarily to be restricted to this type.

The rod holder generally designated 47 comprises an elongated rigid bar 48 that includes a reinforcing rib 49 (FIG. 10) integral therewith below the underside thereof. At opposite ends of the bar are generally V-shaped, aligned rod engaging portions 50, 51. The rod handle, when on the holder, lies in these V-shaped portions with the bar 48 between said portions spaced below the rod engaging surfaces so that the part of the rod between the portions 50, 51 will be spaced above the bar. Preferably the rod proper will extend outwardly of the V-shaped portion 50, and the sides of the latter are preferably slightly longer than the sides of portion 51. These end portions or V-shaped portions 50, 51 are coated with a relatively soft resilient plastic material, as indicated in FIG. 8 at 52, so as not to mar the rod handle. Normally the plastic material, whether composition or rubber, is easily applied by dipping the V-shaped portions in a fairly quick drying coating material.

At a point nearer to end portion 51 than to end portion 50, the bar 48 is formed with a downwardly projecting boss 53 that is integral with the bar and rib 49 and a post 54 (FIG. 9) coaxial with boss 53 and integral with the latter depends from said boss. The diameter of the boss is slightly greater than that of the post 54, thus providing a downwardly facing shoulder at the juncture between the post and boss.

Said post is formed with a rib 55 along one side and extending longitudinally of the post. This rib is adapted to fit in any one of a plurality of complementarily formed grooves 56 in the sides of a cylindrical socket element 57.

This socket element 57 may, in turn, be integral with a clamp, plate or other attaching device 58 for securing the socket element in any desired position on a boat or seat.

When the post 52 is in the socket element, the rib 55 in one of the grooves 56 will preclude relative rotation between the socket element and the post, and a set screw 59 threadedly extending through a side of the socket element 57 is adapted to hold the post in the socket element.

Rigid and integral with the bar 48 and boss 53 and offset to one side of the bar 48 is a cylindrical enlargement 60 having a through, vertical, threaded bore in which an externally threaded post 61 is threadedly held. This post corresponds in function to post 5 of FIG. 1, and at its upper end it carries a hold-down device, generally designated 62 that is similar in structure and function with hold-down device 8 of FIG. 1.

The device 62 comprises a horizontally extending rod 63 that is rigidly secured to the upper end of post 61 at a point intermediate the ends of the rod. A soft, cylindrical, rubber roller 64 is rotatably held on one end of the rod 63 that projects from one side of the post 61, while the other end 65 of rod 63 provides a handle for manually revolving the roller about the axis of post 61 to and from a position directly over a rod handle when the latter is supported on the V-shaped portions 50, 51. This roller is cylindrical and is depressed when in engagement with the rod handle at the side engaging said rod.

The manner of operating the hold-down device of FIG. 8 is almost the same as already described for the similar structure in FIG. 1. In FIG. 8, however, the handle 65 of the hold-down device is formed with an opening for a stop pin 66 that is parallel with post 61, and the enlargement 60 is formed with a pair of aligned, laterally extending stop members 67, 68 adapted to be engaged by the pin 66 when the rod 63 is parallel with the bar 48 and at which time roller 64 is at one side of the handle of a fishing rod when said handle is supported on the V-shaped portions 50, 51. Thus, the handle 65 cannot accidentally be swung around to a position extending across the fishing rod handle.

The adjustment of the roller 64 to engage different diameter rod handles is readily accomplished by lifting the pin 66 by its upwardly projecting enlarged end 69 until the lower end of the pin clears the stop members 67, 68, at which time the post 61 may be rotated to raise and lower the roller 64 to the desired height.

It should be noted that the angle of the bar 48 relative to horizontal is preferably inclined when the attaching plate or clamp 58 is attached to a boat, seat, or wherever desired.

The distance between the roller 64 and the V-shaped portion 50 is sufficient to receive the reel on a fishing rod handle, such reel, in deep sea fishing being above the rod handle. Obviously the reel can be entirely beyond either of the V-shaped portions, if desired. However, by spacing the post 61 a substantially greater distance from the V-shaped portion 50 than from the V-shaped portion 51, provision is made for positioning the reel between said V-shaped members for those who prefer this arrangement.

The invention as shown in FIG. 6 can readily be modified to provide a stop similar to that shown in FIG. 7a by providing a pin 69 for handle 12 in the same manner as is shown for handle 65, and a pair of laterally outwardly opening recesses 70 can be formed in the side of the rod supporting member so that the hold-down device will be permitted to swing to a position parallel with the rod supporting member, but will be prevented from swinging to a position in which the handle 12 will extend across the rod handle.

Another feature that has been found to be desirable in many instances is the provision of means for preventing accidental release of the fishing rod when the roller 64 is over the rod handle in holding relation.

By mounting a cylindrical member 71 (FIG. 8) on the pin 69 below rod 65 for reciprocable movement of said member 71 on said rod and providing a channel 72 of arcuate cross sectional contour in the side of the enlargement 60 that faces the pin 69, to receive the side of the member 71 that is adjacent to said enlargement, the rod 65 may be releasably held in the position of FIG. 8 for holding a fishing rod handle.

This member 71 has a radially outwardly projecting flange 73 at its upper end that is adapted to ride on the upper surface of the enlargement 60 to hold the cylindrical member 71 against downward movement past the enlargement. Flange 73 also provides a convenient means for lifting the cylindrical member 71 out of the channel 72 by the fingers of the hand that is adapted to manipulate the rod 65.

A coil spring 74 may be interposed between the rod 65 and member 71 to yieldably urge the latter downwardly at all times.

In operation, when the cylindrical member 71 is lifted to clear the upper end of channel 72, the roller 64 may quickly be swung by handle or rod 65 off the fishing rod handle, and said member will ride on the upper side of enlargement 60 when the roller is so swung. The pin 69 will function as already explained, to prevent the rod 65 from swinging to a position over the fishing rod handle.

When the fishing rod handle is replaced on the V-seats 52, and the roller 64 is again swung over the said handle, the cylindrical member 71 will automatically drop into channel 72 to releasably hold the roller over the fishing rod handle until the member 71 is again lifted out of the channel 72.

While spring 74 is not essential under normal conditions, it is desirable, in the event the member 71 should tend to stick on the pin 66, and also to provide a faster movement of the member 71 into the channel 72.

The pin 69 may, of course, be lifted to clear the stops 67 so as to adjust the roller 64 to different diameter fishing rod handles.

Obviously the same structure, insofar as the member 71, channel 72, flange 73 and spring 74 are concerned, may be used in the device shown in FIGS. 1 to 7 and 7a.

Where the larger roller is used, as in FIG. 8, there is no need for making it frusto-conical in cross sectional contour, since it compresses readily, the rubber being relatively soft.

It is to be understood that the appended claims are intended to cover all changes and modifications of the examples of the invention herein shown for the purposes of the disclosure, which do not constitute departures from the spirit and scope of the invention.

I claim:

1. In a fishing rod holder that includes a member having a handle supporting portion on which the elongated handle of such rod is adapted to be held in a fishing position; an elongated hold-down element for releasably holding said handle on said portion, said element being carried by and mounted on said member for revolvable movement of said element about an axis extending transversely of the longitudinal axis of such handle and said element from a handle-holding position extending over and in firm engagement with such handle when the latter is on said portion to a handle-releasing position at one side of said handle to permit freely lifting said handle off said portion when said element is rotated to said handle-releasing position, and means supporting said element on said member for said revolvable movement thereof about said axis, said means being a screw rigid with said element and threadedly connected with said member for movement of said element transversely of the longitudinal axis of said element and toward said longitudinal axis of said rod handle when the latter is on said member upon revolving the latter about said axis of revolution of said screw in one direction to thereby enable progressive tightening of said element against such handle upon rotating said element in said one direction.

2. A fishing rod holder that includes an elongated member having rigid therewith and at the ends thereof a pair of upwardly opening generally V-shaped portions between and against the sides of which V-shaped portions the elongated handle of a fishing rod is adapted to be held in a fishing position, a threaded post in a position with its longitudinal axis generally perpendicular to said member and means rigid with said member threadedly supporting said post in said position projecting upwardly therefrom at one side of such handle when the latter is in said fishing position against the sides of said V-shaped portions for movement of said post axially thereof upon rotating said post, a rod secured to the upper end of said post projecting at one end thereof laterally from one side thereof and supported by said post for movement from a first position projecting over such handle when the latter is in said fishing position to a second position alongside such handle and extending generally parallel therewith, a roller carried on said one end of said rod for movement therewith and yieldably engaging such handle when the latter is in said fishing position and for holding said handle in said last mentioned position, said roller being free from engagement with such handle when said rod is in said second position, rod holding means for releasably holding said rod against movement thereof from said first position to said second position, said last mentioned means being movable to a releasing position releasing said rod for movement to said second position, and means engageable with said rod holding means for releasably holding it in said releasing position.

3. A fishing rod holder that includes an elongated member having rigid therewith and at the ends thereof a pair of upwardly opening generally V-shaped portions between and against the sides of which V-shaped portions the elongated handle of a fishing rod is adapted to be held in a fishing position, a threaded post in a position with its longitudinal axis generally perpendicular to said member and means rigid with said member threadedly supporting said post in said position projecting upwardly therefrom at one side of such handle when the latter is in said fishing position against the sides of said V-shaped portions for movement of said post axially thereof upon rotating said post, a rod secured to the upper end of said post projecting at one end thereof laterally from one side thereof and supported by said post for movement from a first position projecting over such handle when the latter is in said fishing position to a second position alongside such handle and extending generally parallel therewith, a roller carried on said one end of said rod for movement therewith and yieldably engaging such handle when the latter is in said fishing position and for holding said handle in said last mentioned position, said roller being free from engagement with such handle when said rod is in said second position, rod holding means for releasably holding said rod against movement thereof from said first position to said second position, said last mentioned means being movable to a releasing position releasing said rod for movement to said second position, and means engageable with said rod holding means for releasably holding it in said releasing position, rod limiting means for limiting the movement of said rod between said first and said second positions.

4. A fishing rod holder for a rod having an elongated handle at one end thereof, comprising: an elongated rod holder adapted to support said handle thereon in a position extending longitudinally thereof, a base adapted to be secured to a support, a horizontal shaft on said base supporting said holder for swinging relative to said base about the axis of said shaft, connector means supported on said shaft for rotary movement relative to said holder and said base about said axis, a spring connecting said connector means with said holder adapted to be tensioned upon swinging said holder relative to said connector means in one direction for yieldably swinging said holder in an opposite direction to said one direction upon release of said holder after said spring is so tensioned whereby a rod secured on said holder will be swung with said holder in said opposite direction under the influence of said spring, connector holding means for releasably securing said connector means rigid with said base in any one of different positions of said connector means about said axis, holder securing means for releasably securing said holder and said connector means together whereby said connector means and said holder may be moved as a unit about said axis to different angular positions of said holder relative to horizontal and secured in any of said different angular positions by said connector holding means independently of the influence of said spring.

5. A fishing rod holder for a rod having an elongated handle at one end thereof, comprising: an elongated rod holder adapted to support said handle thereon in a position extending longitudinally thereof, a base adapted to be secured to a support, a horizontal shaft on said base supporting said holder for swinging relative to said base about the axis of said shaft, connector means supported on said shaft for rotary movement relative to said holder and said base about said axis, a spring connecting said connector means with said holder adapted to be tensioned upon swinging said holder relative to said connector means in one direction for yieldably swinging said holder in an opposite direction to said one direction upon release of said holder after said spring is so tensioned whereby a rod secured on said holder will be swung with said holder in said opposite direction under the influence of said spring, connector holding means for releasably securing said connector means rigid with said base in any one of different positions of said connector means about said axis, holder securing means for releasably securing said holder and said connector means together whereby said connector means and said holder may be moved as a unit about said axis to different angular positions of said holder relative to horizontal and secured in any of said different angular positions by said connector holding means independently of the influence of said spring, and latch means carried by said base engageable with said holder for releasably holding said spring under tension when said holder is swung in said one direction and when said holder securing means is released and when said connector holding means secures said base and said connector means rigidly together to permit said swinging of said holder in said opposite direction upon release of said latch means.

(References on following page)

References Cited in the file of this patent
UNITED STATES PATENTS

| | | |
|---|---|---|
| 388,433 | Meisselbach | Aug. 28, 1888 |
| 1,512,130 | Pardue | Oct. 21, 1924 |
| 2,069,561 | Sandidge | Feb. 2, 1937 |
| 2,184,583 | Danko | Dec. 26, 1939 |
| 2,599,160 | Brauer | June 3, 1952 |
| 2,606,731 | Harris | Aug. 12, 1952 |
| 2,642,690 | Soenksen | June 23, 1953 |
| 2,784,517 | Mooney | Mar. 12, 1957 |